US012780160B2

(12) United States Patent
Truffello

(10) Patent No.: US 12,780,160 B2
(45) Date of Patent: Nov. 3, 2026

(54) BRAKE-FEEL SIMULATION DEVICE AND ACTUATION METHOD OF A BRAKING SYSTEM

(71) Applicant: BREMBO S.p.A., Curno (IT)

(72) Inventor: Martina Truffello, Curno (IT)

(73) Assignee: Brembo S.p.A., Curno (IT)

( * ) Notice: Subject to any disclaimer, the term of this patent is extended or adjusted under 35 U.S.C. 154(b) by 0 days.

(21) Appl. No.: 18/997,233

(22) PCT Filed: Jul. 12, 2023

(86) PCT No.: PCT/IB2023/057147
§ 371 (c)(1),
(2) Date: Jan. 21, 2025

(87) PCT Pub. No.: WO2024/018332
PCT Pub. Date: Jan. 25, 2024

(65) Prior Publication Data

US 2026/0028003 A1 Jan. 29, 2026

(30) Foreign Application Priority Data

Jul. 22, 2022 (IT) ........................ 102022000015435

(51) Int. Cl.
*B60T 8/40* (2006.01)
*B60T 7/04* (2006.01)

(52) U.S. Cl.
CPC .............. *B60T 8/409* (2013.01); *B60T 7/042* (2013.01); *B60T 2220/04* (2013.01); *B60T 2270/82* (2013.01)

(58) Field of Classification Search
CPC ..... B60T 2220/04; B60T 8/4081; B60T 8/409
See application file for complete search history.

(56) References Cited

U.S. PATENT DOCUMENTS

2018/0001875 A1 1/2018 Houtman et al.
2020/0070793 A1 * 3/2020 Yu ......................... B60T 8/3265

FOREIGN PATENT DOCUMENTS

| | | | | | |
|---|---|---|---|---|---|
| CN | 203126814 | U | * | 8/2013 | |
| CN | 113479179 | A | | 10/2021 | |
| DE | 102010025252 | A1 | * | 12/2011 | .............. B60T 7/042 |
| DE | 102010025252 | B4 | | 1/2013 | |
| DE | 102011079454 | A1 | | 1/2013 | |

OTHER PUBLICATIONS

European Patent Office, International Search Report, issued in PCT/IB2023/057147, Oct. 24, 2023, Rijswijk, NL.

* cited by examiner

*Primary Examiner* — Abiy Teka
(74) *Attorney, Agent, or Firm* — Marshall & Melhorn, LLC

(57) ABSTRACT

A braking feel simulator device for a braking system adapted to be connected to a brake pedal has a thrust piston and an electromechanical opposition device. The thrust piston is configured to be biased in translation against the electromechanical opposition device in response to an actuation of the brake pedal. The electromechanical opposition device is configured to oppose a translation of the thrust piston.

16 Claims, 11 Drawing Sheets

BRAKE-FEEL SIMULATION DEVICE AND ACTUATION METHOD OF A BRAKING SYSTEM

FIELD OF THE INVENTION

The present invention relates to a braking feel simulator device for a Brake-By-Wire ("BBW") type braking system of vehicles with two or more wheels actuatable by a driver by means of a brake pedal or lever, and a braking system provided with such a braking feel simulator device.

BACKGROUND ART

In braking systems of the BBW type, there is a decoupling between force and displacement imparted on the brake pedal or lever by the driver and the resulting braking force which is applied by the calipers to the vehicle wheels.

In BBW braking systems, the force and displacement imparted by the driver on the brake pedal or lever are transduced into an electrical signal which is processed by a control unit to control the actuation of the braking system calipers.

Accordingly, it is known to equip the BBW braking systems with a braking feel simulator device, referred to as a "simulator device" for brevity, connected to the brake pedal or lever and configured to simulate the feel and stiffness of a brake pedal or lever of conventional hydraulic braking systems, and thus emulate the "stiffness curve" thereof.

"Stiffness curve" means the relationship between the displacement of the brake pedal or lever along its stroke and the respective reaction force applied by the simulator device on the brake pedal or lever, and thus by the brake pedal or lever on the driver. In general, the stiffness curve has a first segment with low stiffness, a second segment with medium stiffness, and a third segment with high stiffness. Again in general terms, a steeper, "hard" stiffness curve is preferred for an "aggressive" or "sporty" driving style, while a less steep, "soft" stiffness curve is preferred for a "city" or "eco" driving style.

In the prior art, the stiffness curve of the simulator device can be designed beforehand, based on the driver's needs, so that the brake pedal or lever has the "hardness" required by the driver.

The known simulator devices comprise a plurality of elastic elements, usually coil springs, arranged in series or parallel and configured to apply, upon a tensile or compressive stress thereof, an overall reaction force, which replicates the stiffness curve of a conventional hydraulic braking system.

However, the known simulator devices do not allow modulating or adjusting the stiffness curve, and thus the "hardness" of the brake pedal or lever, without a complete redesign of the simulator device. Therefore, the known simulator devices are not customizable and adjustable to the needs of different driving styles, unless the simulator device is disassembled from the braking system and the components thereof are redesigned and replaced.

Moreover, the stiffness curve achieved by known simulator devices is subject to instabilities and variations over time, mainly due to the mechanical tolerances of the several components inside the simulator device, and in particular the tolerances of the group of springs and elastic elements arranged in series and in parallel inside the simulator device.

Moreover, the known simulator devices do not return tactile signals and feedback to the driver, such as the trembling of the brake pedal of a conventional braking system which is triggered when the ABS intervenes.

SUMMARY OF THE INVENTION

It is the object of the present invention to provide a braking feel simulator device and a braking system provided with such a simulator device, such as to obviate at least some of the drawbacks of the prior art.

It is a particular object of the present invention to provide a simulator device configured to allow the adjustment and customization of the stiffness curve thereof without requiring a complete redesign.

It is a further particular object of the present invention to provide a simulator device, which is more stable, more efficient, and less prone to the mechanical deterioration typical of known simulator devices.

It is a further particular object of the present invention to provide a simulator device configured to return tactile signals and feedback to the driver, such as the trembling of the brake pedal of a conventional braking system which is triggered when the ABS intervenes.

These and other objects are achieved by a braking feel simulator device and a braking system provided with such a simulator device according to the independent claims.

The dependent claims relate to preferred and advantageous embodiments of the present invention.

FIGURES

In order to better understand the invention and appreciate the advantages thereof, some non-limiting exemplary embodiments thereof will be described below with reference to the accompanying drawings, in which:

FIG. 1 diagrammatically shows a braking system comprising a braking feel simulator device, according to the prior art;

FIG. 2 diagrammatically shows a braking system comprising a braking feel simulator device, according to an embodiment of the invention;

Figure 1:
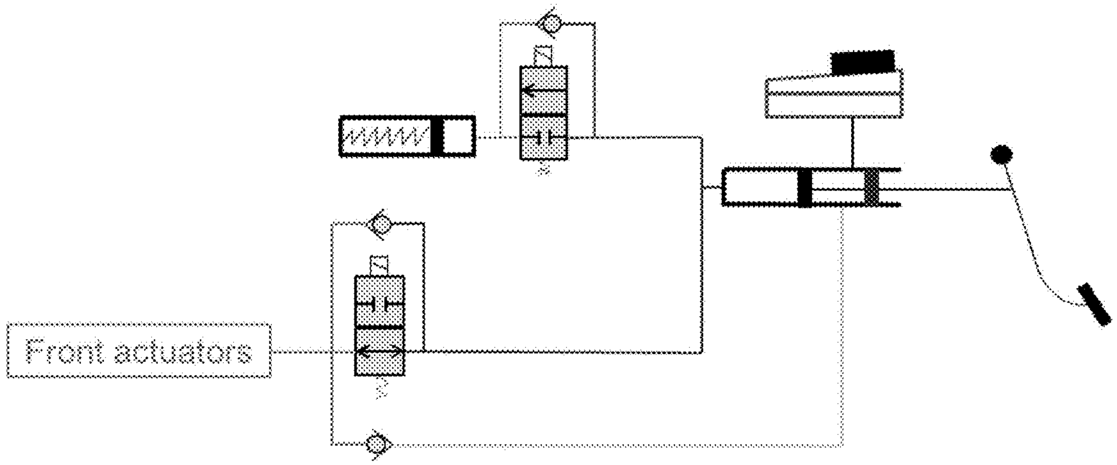
FIG. 1 PRIOR ART
Figure 2:
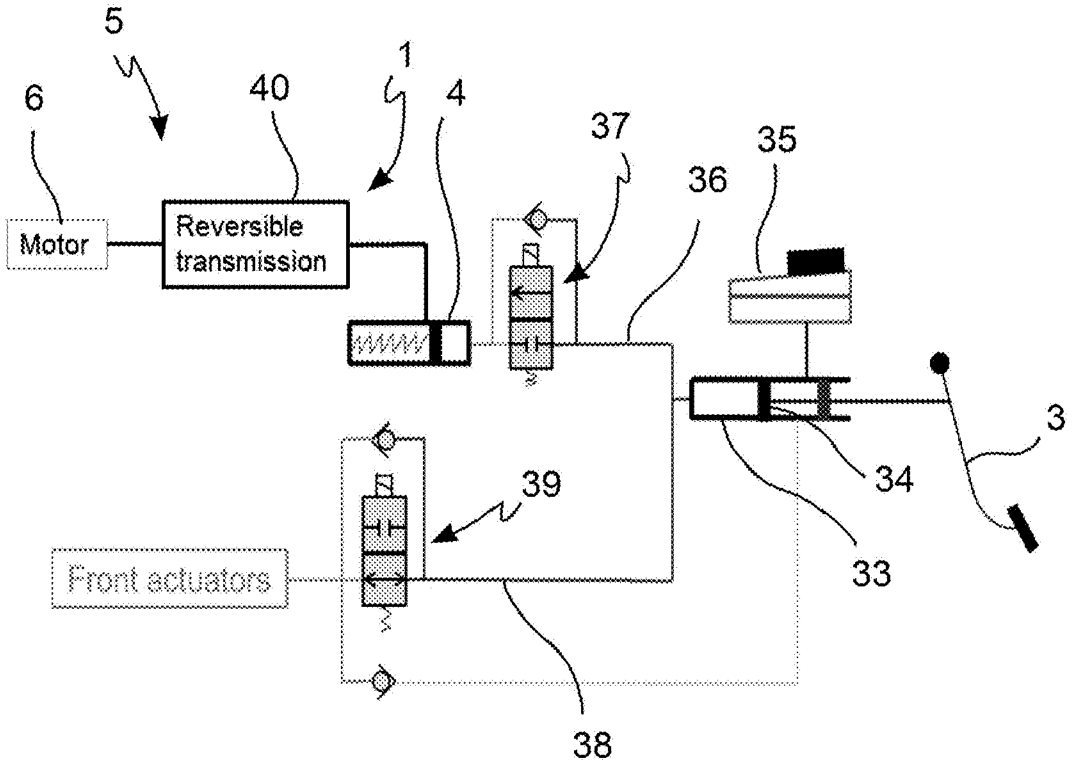
Figure 3:
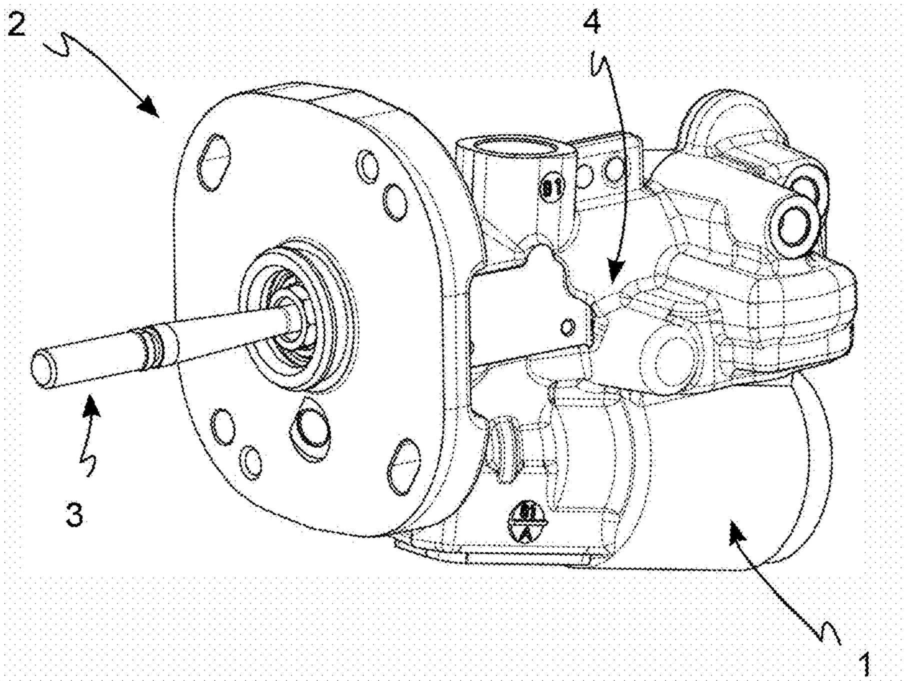
FIG. 3 is a front perspective view of a braking feel simulator device according to an embodiment of the invention.
Figure 4:
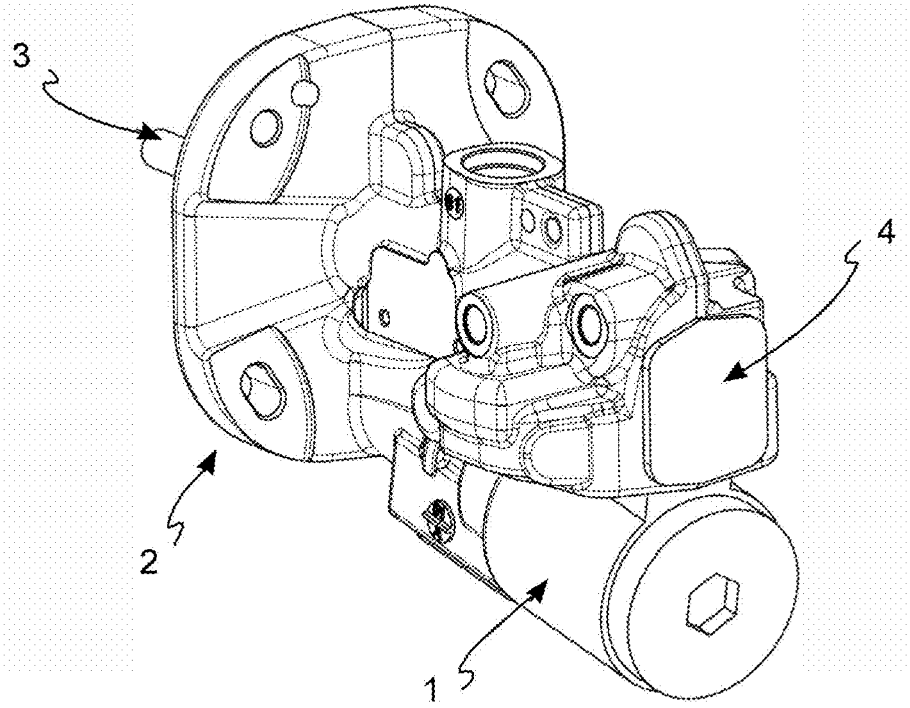
FIG. 4 is a rear perspective view of the braking feel simulator device shown in FIG. 3.
Figure 5:
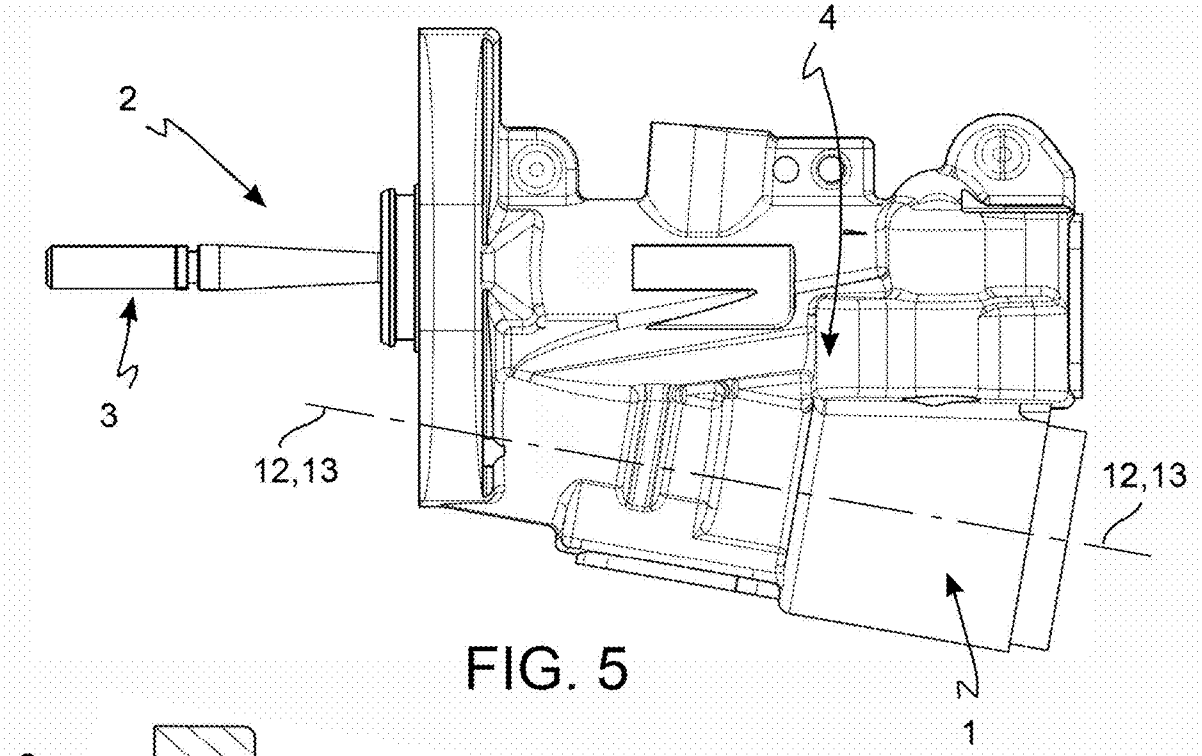
FIG. 5 is a side view of the braking feel simulator device shown in FIG. 3.
Figure 6:
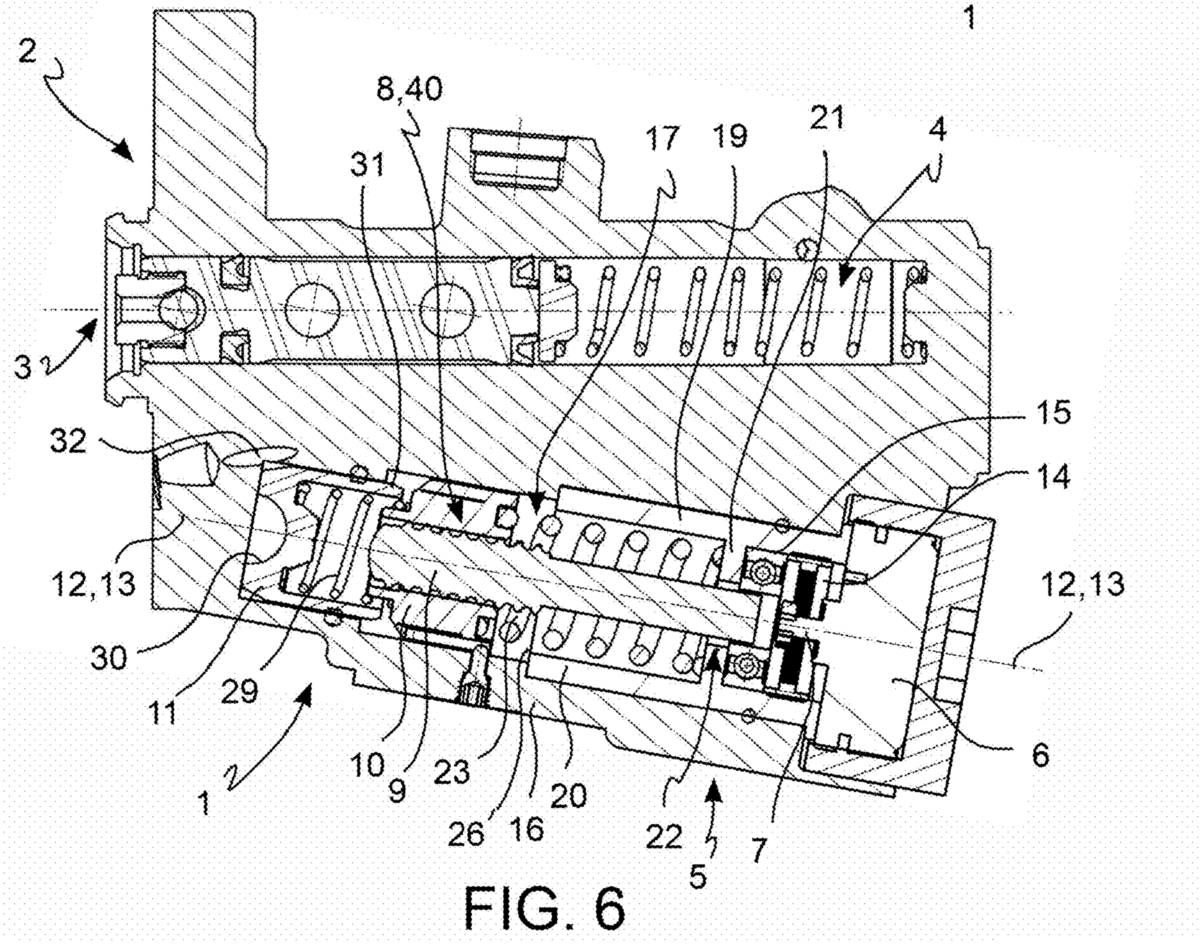
FIG. 6 is a longitudinal section view of the braking feel simulator device in FIG. 5.
Figure 7:
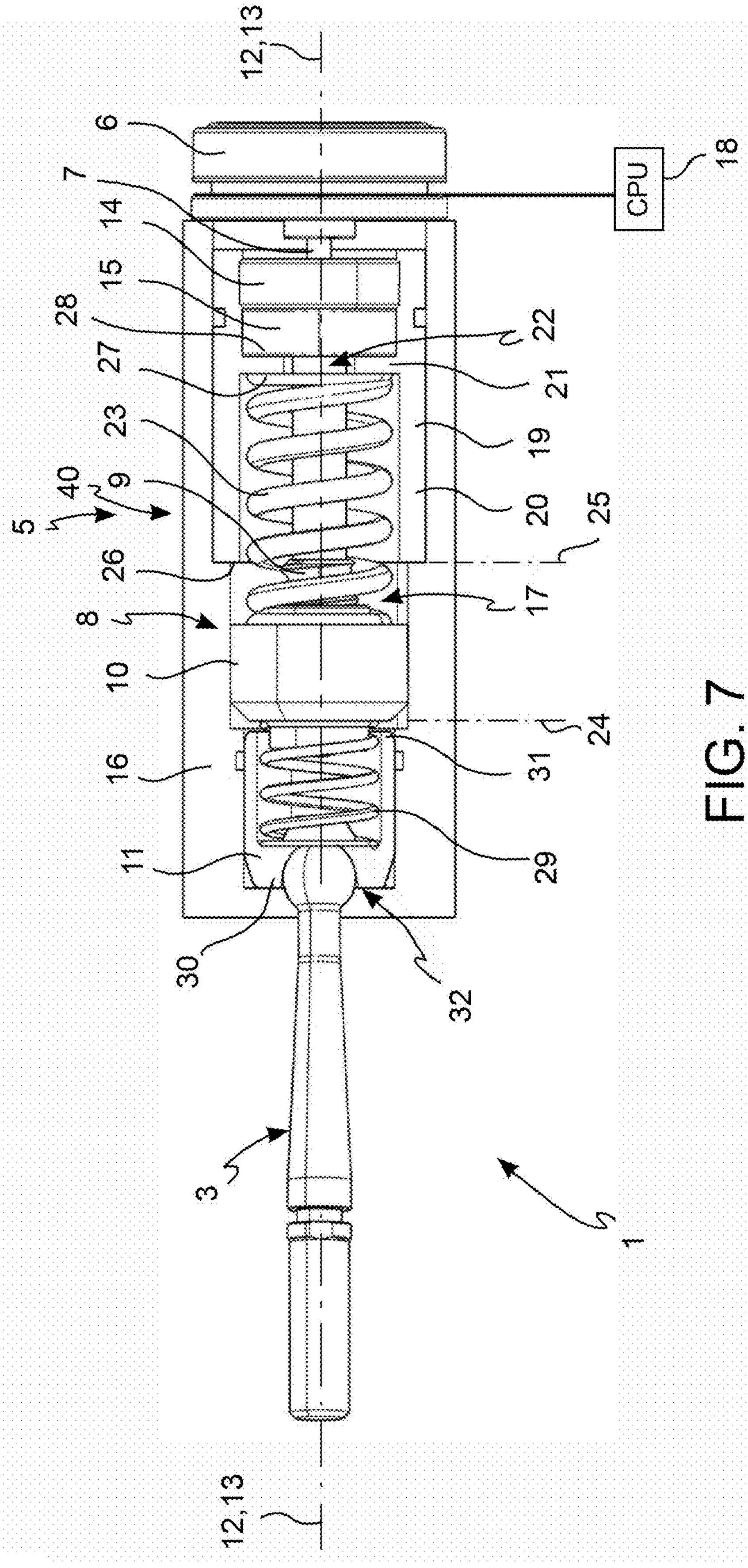
FIG. 7 is a longitudinal section view of a braking feel simulator device according to an embodiment of the invention.
Figure 8:
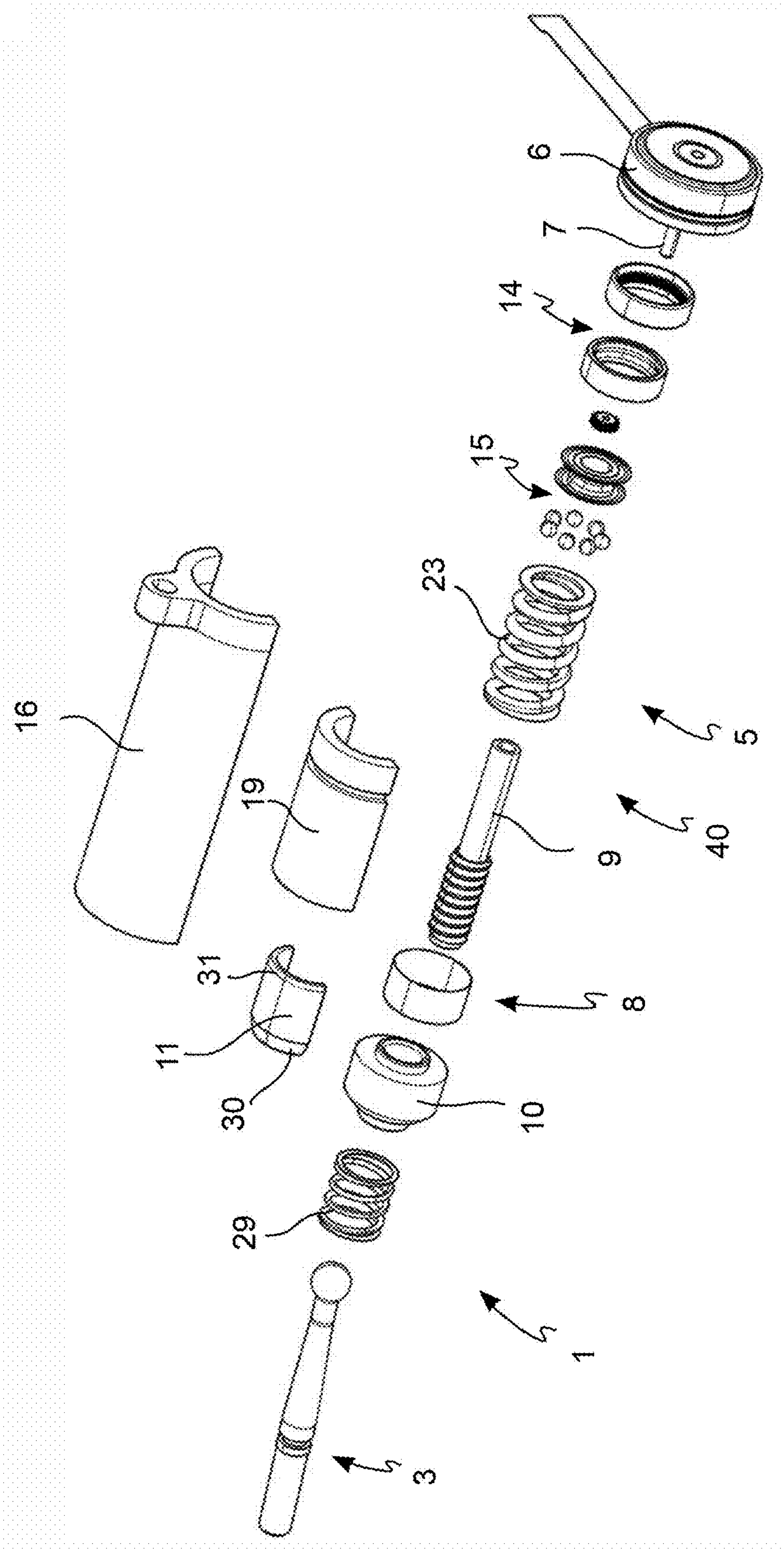
FIG. 8 is an exploded perspective view of a braking feel simulator device according to an embodiment of the invention.
Figure 9:
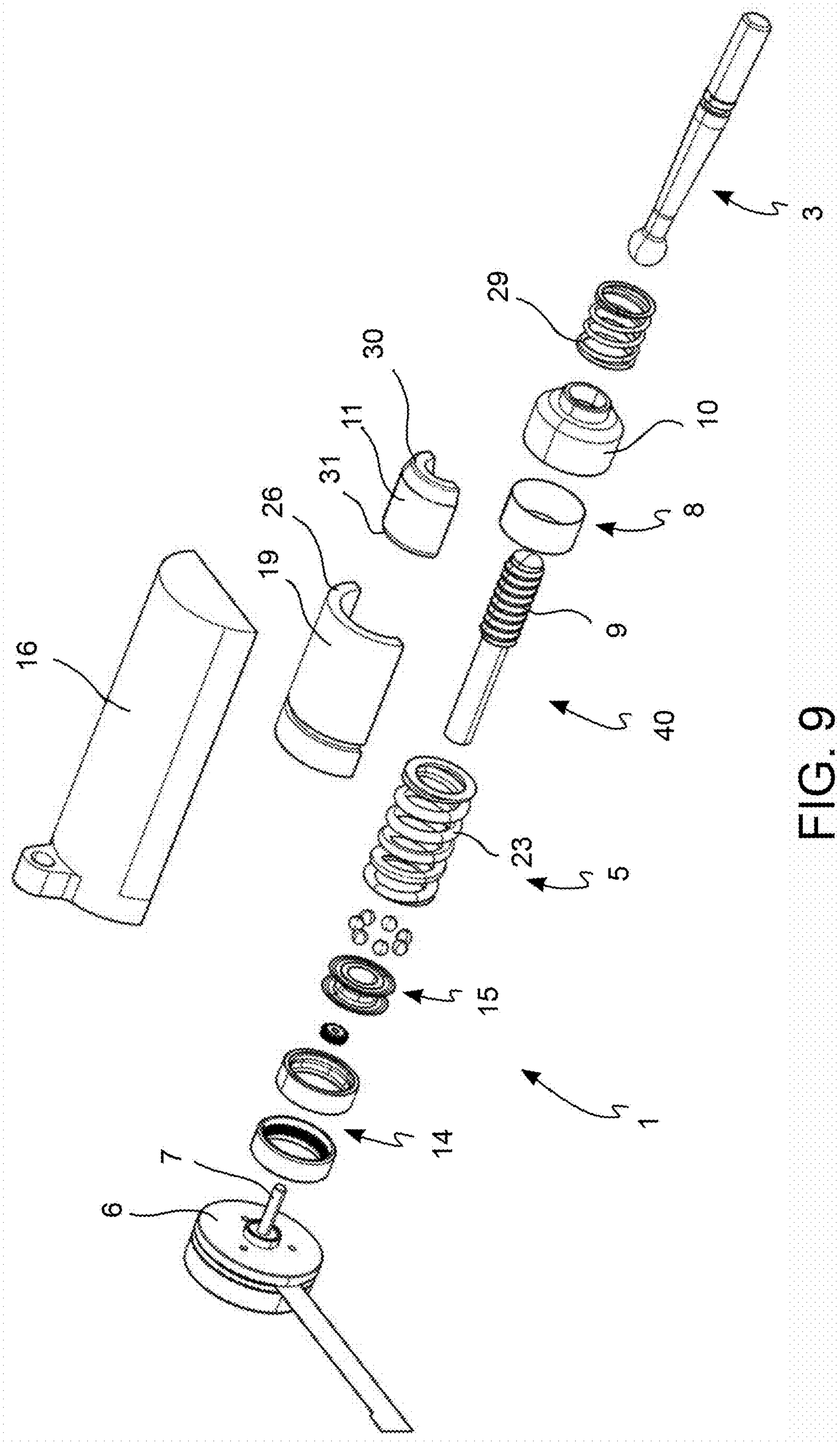
FIG. 9 is a further exploded perspective view of the braking feel simulator device shown in FIG. 8.
Figure 10:
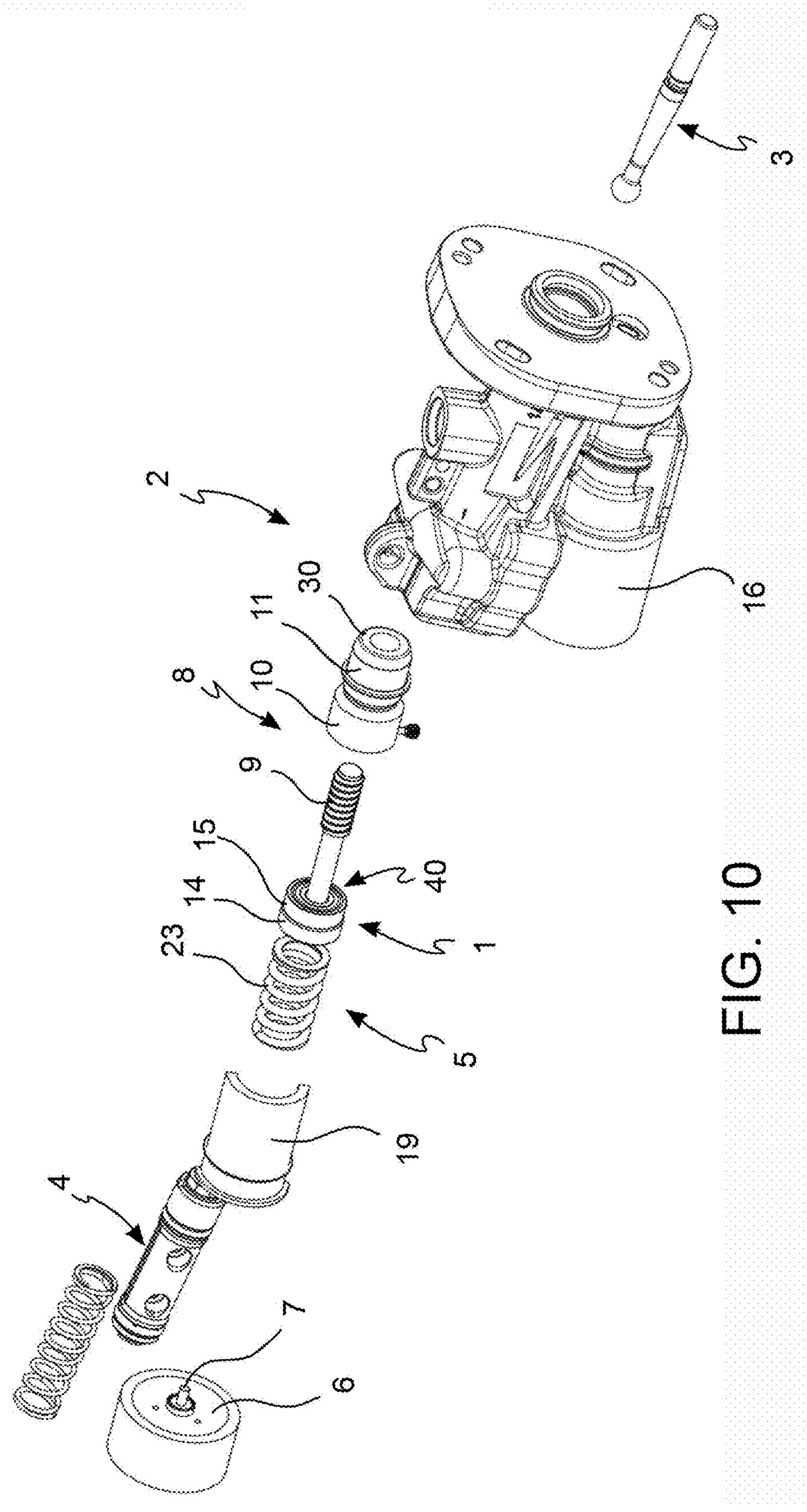
FIG. 10 is an exploded perspective view of a braking feel simulator device according to an embodiment of the invention.
Figure 11:
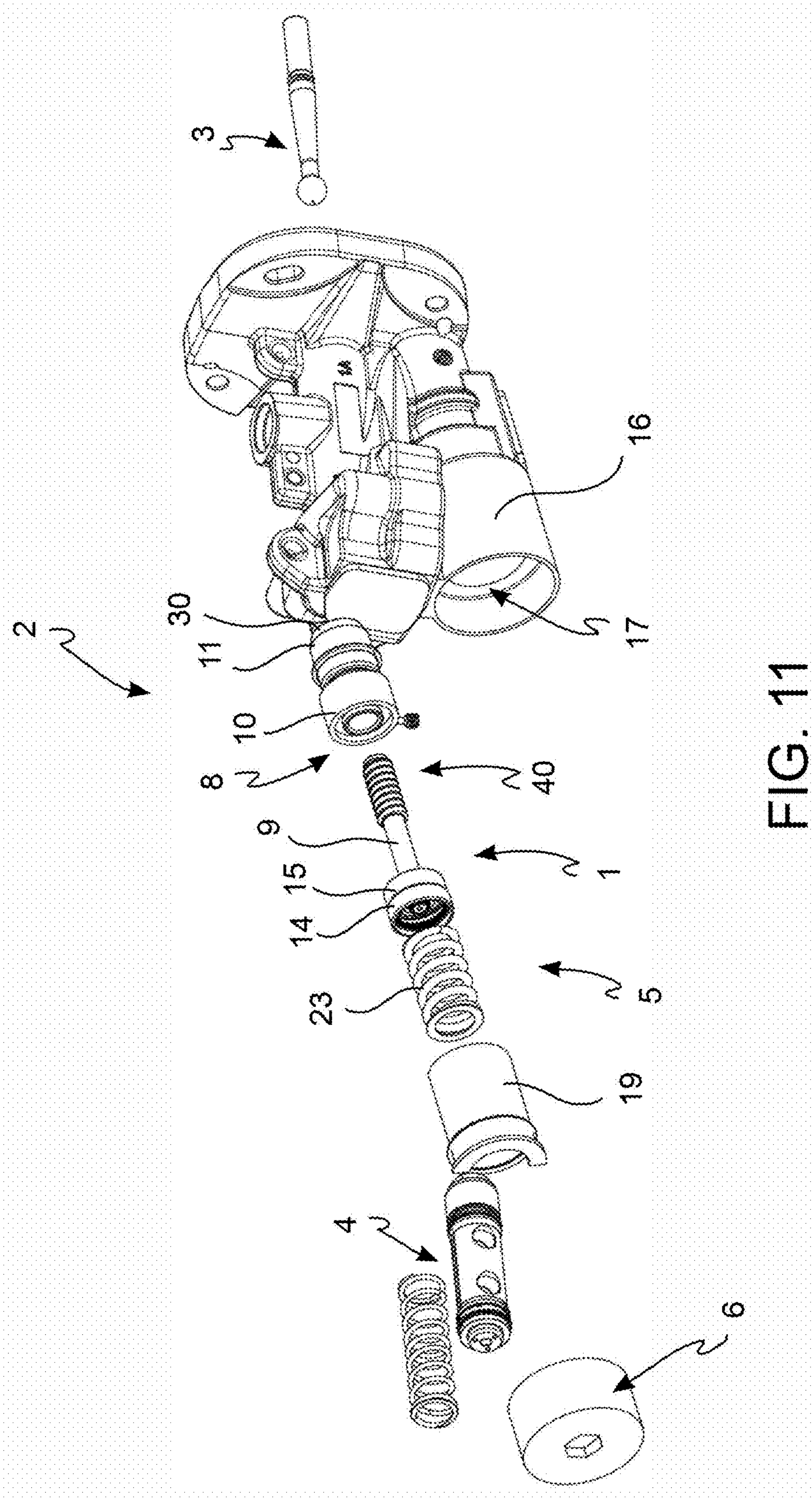
FIG. 11 is a further exploded perspective view of the braking feel simulator device shown in FIG. 10.
Figure 12:
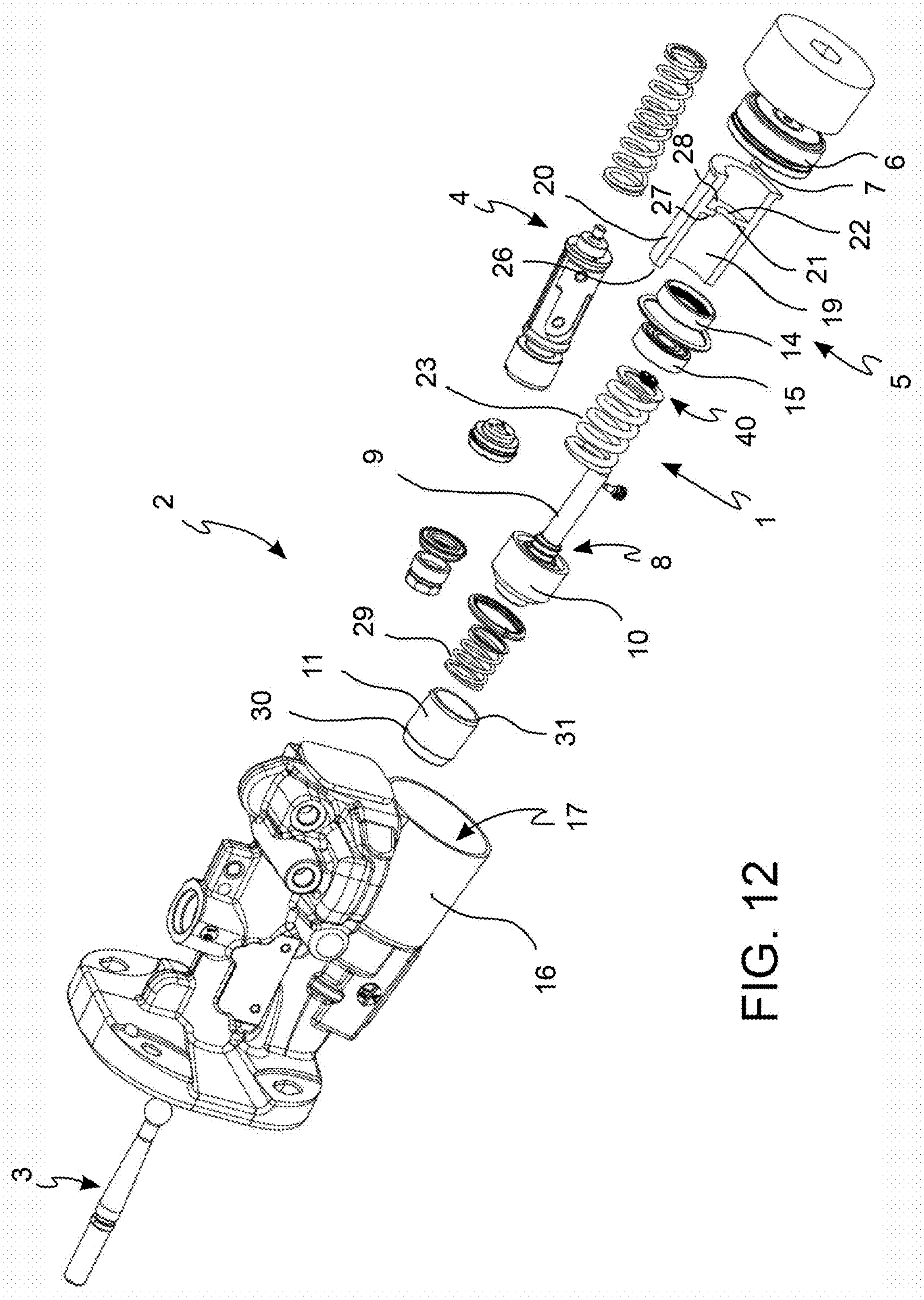
FIG. 12 is an exploded perspective view of a braking feel simulator device according to an embodiment of the invention.
Figure 13:
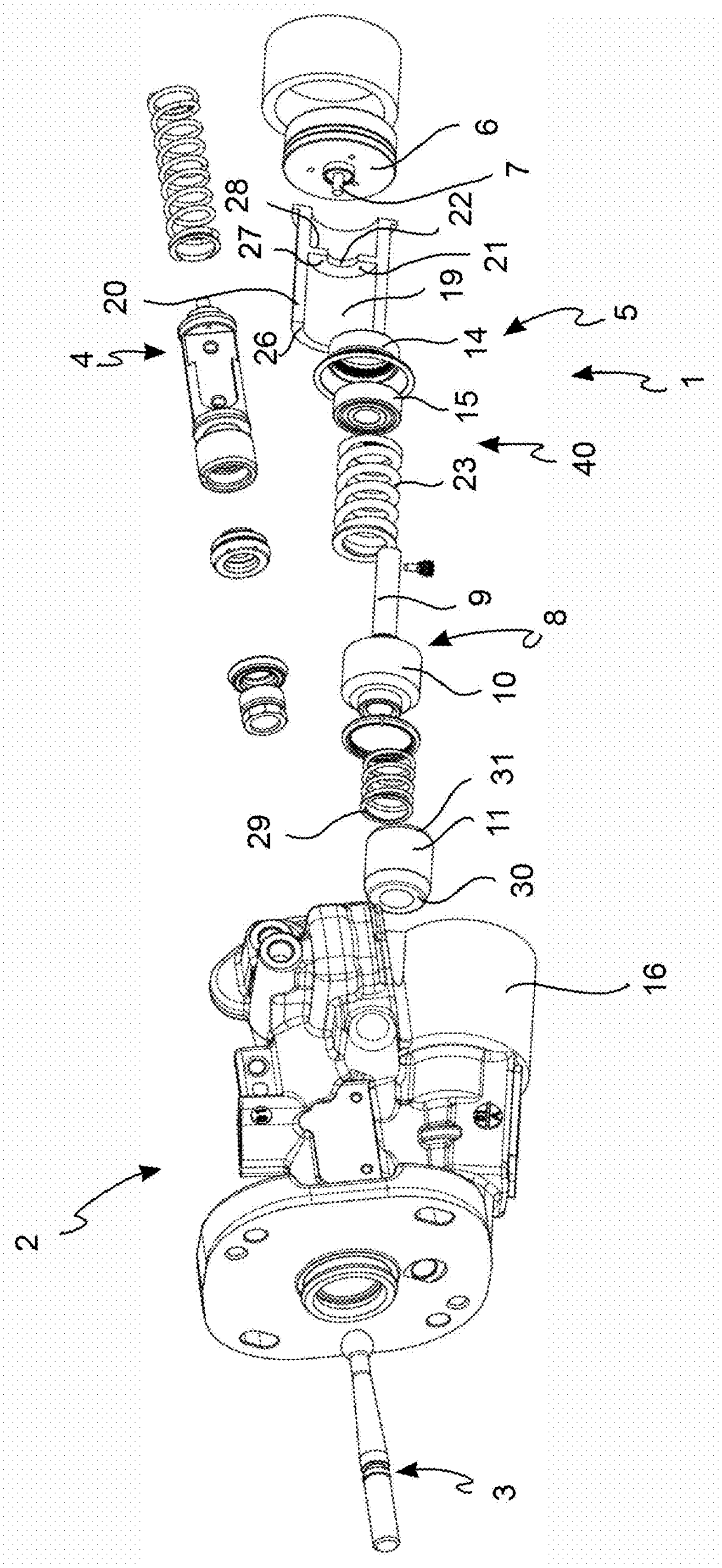
FIG. 13 is a further exploded perspective view of the braking feel simulator device shown in FIG. 12.
Figure 14:
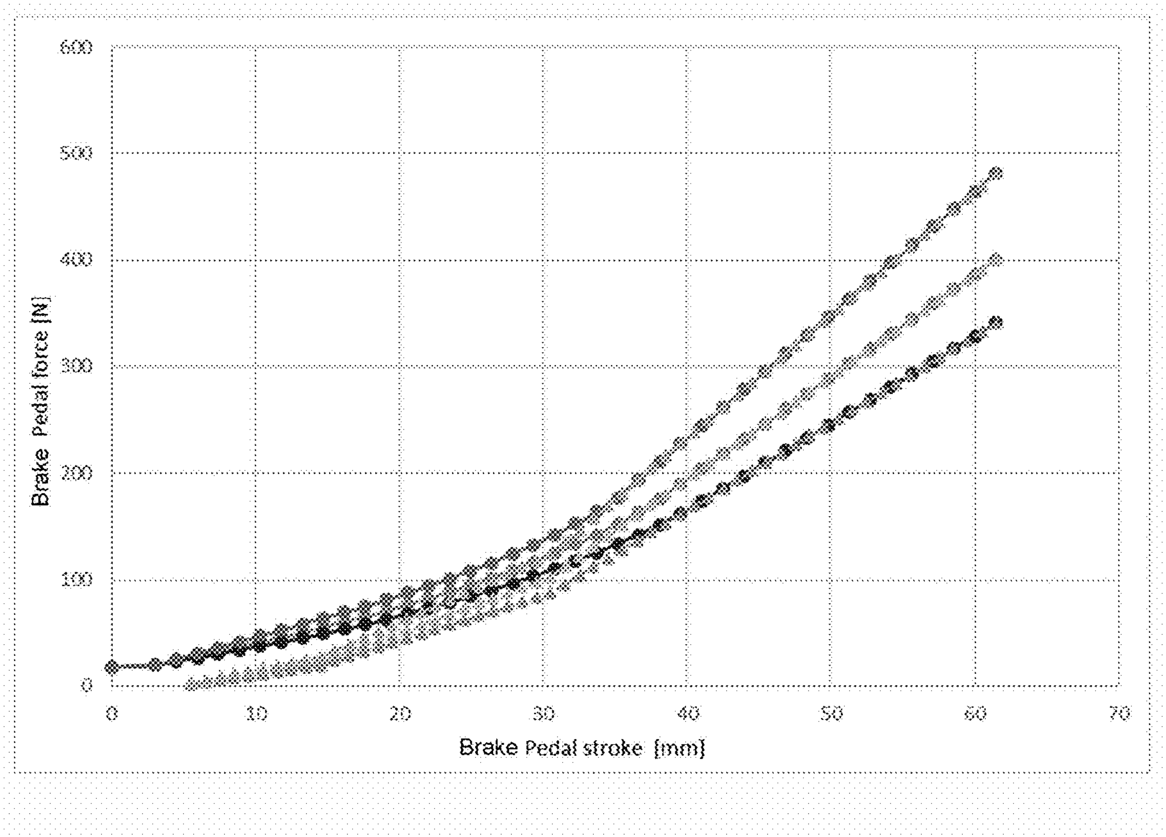

FIG. 14 diagrammatically shows three different stiffness curves achievable by a braking feel simulator device according to the present invention.

DETAILED DESCRIPTION

The present invention is suitable for being applied to a Brake-By-Wire ("BBW") type braking system of vehicles with two or more wheels, which is actuatable by a driver by means of a brake pedal or lever. Therefore, in the present description, the term "brake pedal" means indistinctly both a brake pedal for motor vehicles and the like and a brake lever for motorcycles, mopeds, and the like, unless otherwise specified.

Moreover, the "hydraulic fluid" is a fluid adapted to be pressurized by known pressurization means upon actuation of the brake pedal or the braking feel simulator device or the braking system.

Braking Feel Simulator Device 1

With reference to the figures, a braking feel simulator device is generally indicated by reference numeral 1. The braking feel simulator device 1 is adapted to be used in a braking system 2.

The braking feel simulator device 1 is adapted to be fluidically connected to a brake pedal 3.

Preferably, the braking feel simulator device 1 is adapted to be connected to a brake pedal 3 by means of a hydraulic fluid.

An actuation of the brake pedal 3 thus corresponds to a pressurization of the hydraulic fluid in the braking feel simulator device 1, and to a subsequent actuation of the braking feel simulator device 1.

The braking feel simulator device 1 comprises a thrust piston 11.

Moreover, the braking feel simulator device 1 comprises an electromechanical opposition device 5.

The thrust piston 11 is configured to be biased in translation against the electromechanical opposition device 5, in response to an actuation of the brake pedal 3.

Preferably, the thrust piston 11 is configured to be biased against the electromechanical opposition device 5 by the hydraulic fluid, in response to an actuation of the brake pedal 3.

According to an aspect of the invention, the electromechanical opposition device 5 is configured to oppose the translation of the thrust piston 11.

Advantageously, a braking feel simulator device 1 thus configured allows the stiffness curve to be adjusted and customized without requiring a complete redesign.

Indeed, by means of the electromechanical opposition device 5, it is possible to vary and adjust the counteracting force applied on the thrust piston 11 actuated in translation by the brake pedal 3, and thus vary and adjust the reaction force discharged on the brake pedal 3, i.e., vary and adjust the "hardness" of the stiffness curve of the braking feel simulator device 1.

A higher opposition to the translation of the thrust piston 11 by the electromechanical opposition device 5 corresponds to a higher resistance to the movement of the thrust piston 11 actuated by the brake pedal 3, and thus a higher counteracting force against the actuation of the brake pedal 3 and a harder stiffness curve.

Conversely, a lower opposition to the translation of the thrust piston 11 by the electromechanical opposition device 5 corresponds to a lower resistance to the movement of the thrust piston 11 actuated by the brake pedal 3, and thus a lower counteracting force against the actuation of the brake pedal 3 and a less hard stiffness curve.

With further advantage, the braking feel simulator 1 thus configured is adapted to apply a reaction force on the brake pedal 3 against an actuation of the brake pedal 3.

According to an embodiment, the electromechanical opposition device 5 comprises an electric motor 6 and an opposition mechanism 40.

The opposition mechanism 40 is configured to oppose the translation of the thrust piston 11.

The electric motor 6 is configured to actuate the opposition mechanism 40 so that the opposition mechanism 40 opposes the translation of the thrust piston 11.

According to an embodiment, the opposition mechanism 40 is an irreversible mechanism.

Advantageously, such a configuration allows a retrograde motion of the opposition mechanism 40 in the absence of an actuation by the electric motor 6. Therefore, in the absence of an actuation by the electric motor 6, the opposition mechanism 40 is configured to go back to a resting position thereof.

According to an embodiment, the opposition mechanism 40 is positioned to be interposed between the thrust piston 11 and the electric motor 6.

According to an embodiment, the opposition mechanism 40 is a screw-nut screw assembly 8.

The screw-nut screw assembly 8 faces the thrust piston 11.

The screw-nut screw assembly 8 is coaxial to an actuation axis 13.

The screw-nut screw assembly 8 comprises a screw 9 and a nut screw 10.

The screw 9 and the nut screw 10 are connected to each other so that a relative translation of the nut screw 10 with respect to the screw 9 along the actuation axis 13 corresponds to a relative rotation of the screw 9 with respect to the nut screw 10 about the actuation axis 13.

The electric motor 6 comprises a drive shaft 7 extending along a motor axis 12.

The screw-nut screw assembly 8 is connected to the drive shaft 7.

The electric motor 6 is configured to apply a mechanical torque on at least one of the screw 9 and the nut screw 10.

Moreover, the thrust piston 11 is configured to be biased against the screw-nut screw assembly 8, in response to an actuation of the brake pedal 3.

The thrust piston 11 thus translates at least one of the screw 9 and the nut screw 10 along the actuation axis 13.

Moreover, the electric motor 6 is configured to oppose said translation of the thrust piston 11 and of the at least one of the screw 9 and the nut screw 10 along the actuation axis 13 by applying a mechanical opposing torque on the screw-nut screw assembly 8.

Advantageously, a braking feel simulator device 1 thus configured allows modifying the stiffness curve according to which the reaction force is applied against the actuation of the brake pedal 3.

Indeed, according to the strength of the mechanical opposing torque applied by the electric motor 6 on the screw-nut screw assembly 8, the braking feel simulator device 1 applies reaction forces of different strengths against an actuation of the brake pedal 3.

Specifically, the braking feel simulator device 1 thus configured allows achieving a "soft" stiffness curve under conditions in which the mechanical opposing torque applied by the electric motor 6 is of low magnitude. Under such conditions, an actuation of the brake pedal 3, and thus the consequent translation of the thrust piston 11 in the electromechanical opposition device 5, experiences a lower resistance by the braking feel simulator device 1, due to a low opposing action of the electric motor 6 against the translation of the thrust piston 11.

Conversely, the braking feel simulator device 1 thus configured allows achieving a "hard" stiffness curve under conditions in which the mechanical opposing torque applied by the electric motor 6 is of greater magnitude. Under such conditions, an actuation of the brake pedal 3, and thus the consequent translation of the thrust piston 11 to the electromechanical opposition device 5, experiences a greater resistance by the braking feel simulator device 1, due to a higher opposing action of the electric motor 6 against the translation of the thrust piston 11.

With added advantage, the braking feel simulator device 1 thus configured allows modifying the stiffness curve according to which the reaction force is applied against the actuation of the brake pedal 3, without the need for a redesign or replacement of the simulator device components, but simply by modifying the strength of the mechanical opposing torque applied by the electric motor 6.

With added advantage, the braking feel simulator device 1 thus configured has a simplified structure and is more stable, more efficient, and less prone to mechanical deterioration typical of the known simulator devices.

With further advantage, the braking feel simulator device 1 thus configured allows providing tactile signals and feedback to the driver, such as the trembling of the brake pedal of a conventional braking system which is triggered when the ABS intervenes. This is achieved by the action of electric motor 6, configured to vary the strength of the mechanical opposing torque applied on the screw-nut screw assembly 8 and then transferred to the brake pedal 3, so as to obtain the desired tactile signals or vibrations.

According to an embodiment, the electromechanical opposition device 5 comprises a housing 16 extending along the actuation axis 13.

The housing 16 defines a housing compartment 17 therein.

The screw-nut screw assembly 8 is housed inside the housing compartment 17.

Preferably, the housing 16 is substantially cylindrical in shape and coaxial to the actuation axis 13.

According to an embodiment, the screw 9 of the screw-nut screw assembly 8 is connected to the drive shaft 7 of the electric motor 6.

The screw 9 is thus configured to receive a mechanical torque from the electric motor 6.

The nut screw 10 of the screw-nut screw assembly 8 is configured to translate along the actuation axis 13, with respect to the screw 9 and the electric motor 6.

Moreover, the nut screw 10 is configured to translate, but not rotate, with respect to the housing 16.

The thrust piston 11 is configured to be biased, preferably by the hydraulic fluid, against the nut screw 10 in response to an actuation of the brake pedal 3.

The thrust piston 11 thus translates the nut screw 10 along the actuation axis 13.

According to this embodiment, the electric motor 6 is configured to oppose the translation of the nut screw 10 along the actuation axis 13 by applying a mechanical opposing torque on the screw 9.

Specifically, the mechanical opposing torque applied by electric motor 6 on screw 9 biases the screw 9 in the direction of rotation opposite to the direction of rotation in which the screw 9 rotates when the nut screw 10 is translated under the bias of the thrust piston 11. Therefore, the mechanical opposing torque opposes the rotation of the screw 9 caused by the translation of the nut screw 10 biased by the thrust piston 11.

Advantageously, the mechanical opposing torque of the electric motor 6 against the translation of the nut screw 10, achieved by means of the screw 9, modifies the magnitude of the overall reaction force applied by the braking feel simulator device 1 on the brake pedal 3. In particular, the adjustment of the strength of the mechanical opposing torque applied by the electric motor 6 results in an adjustment of the stiffness curve of the braking feel simulator device 1, and thus of the reaction force returned to the driver who actuates the brake pedal 3.

According to an embodiment, the screw-nut screw assembly 8 and the electric motor 6 are positioned so that the actuation axis 13 coincides with the motor axis 12.

According to an embodiment, the electric motor 6 is positioned to be opposite to the thrust piston 11 with respect to the screw-nut screw assembly 8.

Advantageously, such a configuration ensures integrity and structural strength of the electromechanical opposition device 5.

According to an embodiment, the nut screw 10 is positioned to be opposite to the electric motor 6 with respect to the screw 9.

According to this embodiment, the thrust piston 11 is configured to translate the nut screw 10 in the direction of the electric motor 6.

Advantageously, such a configuration reduces the overall strains to which the electromechanical opposition device 5 is subjected during the operation thereof.

According to an embodiment of the invention, the electromechanical opposition device 5 comprises a transmission 14.

The transmission 14 is interposed between the electric motor 6 and the screw-nut screw assembly 8.

Preferably, the transmission 14 is a transmission of the reversible type. By way of example, the transmission 14 is an epicyclic transmission, a harmonic or cycloidal reduction gear, or a cascading gear distribution.

According to an embodiment, the electromechanical opposition device 5 comprises a bearing 15 interposed between the electric motor 6 and the screw-nut screw assembly 8.

Preferably, the bearing 15 is a bearing of the thrust type. Preferably, the bearing 15 is a ball or roller type bearing.

According to an embodiment, the nut screw 10 is translatable between a stroke start position 24, located at the thrust piston 11, and a stroke stop position 25, opposite to the thrust piston 11 with respect to the nut screw 10.

According to an embodiment, the electromechanical opposition device 5 comprises a first elastic element 23.

The first elastic element 23 is configured to bias the nut screw 10 towards the stroke start position.

Therefore, during the operation of the braking feel simulator device 1, the nut screw 10 is translated by the thrust piston 11 from the stroke start position 24 in the direction of the stroke stop position 25. Such a movement of the nut screw 10 is opposed by the mechanical opposing torque of the electric motor 6 and the elastic force applied by the first elastic element 23. When the actuation of the braking feel simulator device 1 is interrupted, the first elastic element 23 biases the nut screw 10 back to the stroke start position 24.

Moreover, the first elastic element 23 is configured to bias the electromechanical opposition device 5 towards t a resting position of the electromechanical opposition device 5.

Resting position means the position taken by the electromechanical opposition device 5 when it is not biased by the hydraulic fluid, i.e., when the electromechanical opposition device 5 is not actuated in response to an actuation of the brake pedal 3.

Advantageously, the return of the nut screw 10 to the stroke start position 24 is facilitated by the reversible-type transmission 14.

According to an embodiment, the first elastic element 23 is a helical compression spring.

According to a preferred embodiment, the helical compression spring 23 is positioned to be coaxial to the screw 9 of the screw-nut screw assembly 8.

Advantageously, such a positioning reduces the overall dimensions of the electromechanical opposition device 5.

According to an embodiment, the electromechanical opposition device 5 comprises a second backing body 19.

The backing body 19 is fixed inside the housing compartment 17, opposite to the thrust piston 11 with respect to the nut screw 10.

According to an embodiment, the backing body 19 forms a stroke stop wall 26 facing the nut screw 10.

The stroke stop wall 26 defines the stroke stop position 25 of the nut screw 10.

Specifically, the stroke stop wall 26 is positioned so that the nut screw 10 translated by the thrust piston 11 abuts against the stroke stop position 25 of the nut screw 10.

Advantageously, by means of the backing body 19, it is possible to adjust a stroke stop for the actuation of the electromechanical opposition device 5 and thus adjust a stroke stop for the braking feel simulator device 1 and the brake pedal 3.

According to an embodiment, the backing body 19 is hollow in the direction parallel to the actuation axis 13.

According to this embodiment, the screw 9 of the screw-nut screw assembly 8 at least partially passes through the backing body 19, along the actuation axis 13.

According to an embodiment, the backing body 19 comprises a perimeter wall 20 extending along the actuation axis 13, preferably coaxial to the actuation axis 13.

Moreover, the backing body 19 comprises a backing wall 21 transverse to the actuation axis 13.

The backing wall 21 extends from the perimeter wall 20 in the radial direction to the actuation axis 13.

According to an embodiment, the backing wall 21 defines a through-hole 22 coaxial to the actuation axis 13.

The screw 9 of the screw-nut screw assembly 8 extends through the through-hole 22 of the backing wall 21.

The backing wall 21 forms a first backing surface 27 facing the nut screw 10 and an opposite second backing surface 28 facing the electric motor 6.

According to an embodiment, a first end of the first elastic element 23 is positioned to abut against the nut screw 10 and an opposite second end of the first elastic element 23 is positioned to abut against the first backing surface 27 of the backing body 19.

According to an embodiment, either the transmission 14 or the bearing 15 is positioned to abut against the second backing surface 28.

According to a preferred embodiment, the bearing 15 is positioned to abut against the second backing surface 28, and a transmission 14 is positioned to abut against the bearing 15.

According to this embodiment, the bearing 15 and the transmission 14 are at least partially, preferably totally, housed inside the backing housing 19.

Advantageously, such a configuration reduces the overall dimensions of the electromechanical opposition device 5.

According to an embodiment, the electromechanical opposition device 5 comprises a second elastic element 29.

The second elastic element 29 is interposed between the screw-nut screw assembly 8 and the thrust piston 11.

The second elastic element 29 is configured to bias the screw-nut screw assembly 8 away from the thrust piston 11.

According to an embodiment, the second elastic element 29 is interposed between the nut screw 10 and the thrust piston 11, and the second elastic element 29 is configured to bias the nut screw 10 away from the thrust piston 11.

Advantageously, the second elastic element 29 prevents the thrust piston 11 biased by the hydraulic fluid from suddenly impacting against the nut screw 10, with the risk of damaging such components. Conversely, the second elastic element 29 is configured to accommodate the movement, approach, and relative contact between the thrust piston 11 and the nut screw 10.

According to an embodiment, the second elastic element 29 is a helical compression spring.

According to an embodiment, the thrust piston 11 forms a blind piston cavity. The blind piston cavity is open in the direction of the nut screw 10.

According to an embodiment, the second elastic element 29 is at least partially housed inside the blind piston cavity.

Advantageously, such a configuration reduces the overall dimensions of the electromechanical opposition device 5.

According to an embodiment, a first end of the second elastic element 29 is positioned to abut against the thrust piston 11, inside the blind piston cavity, while an opposite second end of the second elastic element 29 is positioned to abut against the nut screw 10.

According to an embodiment, the thrust piston 11 comprises a biasing wall 30 substantially transverse to the actuation axis 13.

Moreover, the thrust piston 11 comprises a thrust wall 31 extending in the direction parallel to the actuation axis 13 transverse to the thrust wall 31.

The thrust piston 11 is configured to receive, on the biasing wall 30, the hydraulic fluid bias adapted to move the thrust piston 11 in translation towards the screw-nut screw assembly 8, preferably the nut screw 10.

The biasing wall 30 faces a conveying pipe 32.

The conveying pipe 32 is configured to fluidically connect the braking feel simulator device 1 to the brake pedal 3 by means of the hydraulic fluid.

Specifically, the conveying pipe 32 is configured to convey the hydraulic fluid into the braking feel simulator device 1 when the braking feel simulator device 1 is activated and the brake pedal 3 is is activated, and to discharge the hydraulic fluid from the braking feel simulator device 1 when the braking feel simulator device 1 is deactivated and the brake pedal 3 is released.

Preferably, the conveying pipe 32 is at least partially defined by the housing 16.

The thrust wall 31 faces the screw-nut screw assembly 8 and is configured to abut against the screw-nut screw assembly 8, preferably against the nut screw 10, upon the actuation of the braking feel simulator device 1.

According to an embodiment, the electric motor 6 is positioned to abut against the housing 16 opposite to the thrust piston 11 and the conveying pipe 32.

Advantageously, such a configuration reduces the overall stresses acting on the braking feel simulator device 1.

Braking System 2

According to a further aspect of the invention, a braking system 2 comprises a braking feel simulator device 1 as described above.

Moreover, the braking system 2 comprises a brake pedal 3 operatively connected to the braking feel simulator device 1.

Advantageously, a braking system 2 thus configured allows achieving, on the brake pedal 3 by means of the braking feel simulator device 1, a counteracting force against the actuation of the brake pedal which follows a stiffness curve. Moreover, such a stiffness curve can be modified and adjusted by means of the braking feel simulator device 1.

According to a possible embodiment, the braking system 2 comprises an absorber 4, configured to apply a reaction force on the brake pedal 3 against an actuation of the brake pedal 3.

In particular, the absorber 4 is configured to apply a reaction force on the brake pedal 3 against an actuation of the brake pedal 3, according to a stiffness curve, i.e., according to a defined relationship between the displacement of the brake pedal 3 along its stroke and the respective reaction force applied by the absorber 4.

According to an embodiment, the braking feel simulator device 1 is fluidically connected to the absorber 4.

Specifically, the electromechanical opposition device 5 is fluidically connected to the absorber 4.

The absorber 4 and the electromechanical opposition device 5 are fluidically connected by means of the hydraulic fluid.

The absorber 4 and the braking feel simulator device 1 are operable by means of the hydraulic fluid in response to an actuation of the brake pedal 3.

The absorber 4 is an absorber of known type, i.e., comprising a plurality of elastic elements, generally helical springs, arranged in series or in parallel and configured to apply, upon a tensile or compressive stress thereof, an overall reaction force replicating the stiffness curve of a conventional hydraulic braking system.

Advantageously, a braking system 2 thus configured allows achieving, on the brake pedal 3 by means of the combined action of absorber 4 and braking feel simulator device 1, a counteracting force against the brake pedal actuation which follows a stiffness curve. Moreover, such a stiffness curve can be modified and adjusted by means of the braking feel simulator device 1.

The stiffness curve achieved by the absorber 4 alone is predefined. Such a stiffness curve is variable and modifiable by the electromechanical opposition device 5 fluidically connected to the absorber 4 by means of the hydraulic fluid.

Advantageously, a braking system 2 thus configured, in which the braking feel simulator device 1 is connected to an absorber 4, allows modifying and adjusting the predefined stiffness curve achievable by the absorber 4 on the brake pedal 3, and therefore allows obtaining a braking system 2 in which the stiffness curve is modifiable and adjustable.

According to this embodiment, if the mechanical opposing torque applied by the electric motor 6 is substantially zero, the reaction force applied on the brake pedal 3 substantially follows the stiffness curve of the absorber 4 itself, and the effect of the electromechanical opposition device 5 on the absorber 4 is due only to the inertia of the electric motor 6 connected to the opposition mechanism 40.

According to an embodiment, the conveying pipe 32 of the braking feel simulator device 1 is configured to fluidically connect the braking feel simulator device 1 to the absorber 4, by means of the hydraulic fluid.

According to an embodiment, the braking system 2 comprises an electronic processing unit 18 electrically connected to the electric motor 6 of the braking feel simulator device 1.

Moreover, the braking system 2 comprises at least one sensor configured to detect an actuation and/or movement of the brake pedal 3.

The electronic processing unit 18 is configured to actuate the electric motor 6 of the electromechanical opposition device 5 only upon the detection, by the at least one sensor, of the actuation and/or movement of the brake pedal 3.

Advantageously, such a configuration allows obtaining energy savings and low stresses of the braking feel simulator device 1.

According to an alternative embodiment, the electronic processing unit 18 is configured to actuate the electric motor 6 of the electromechanical opposition device 5, so as to constantly bias the nut screw 10 of the screw-nut screw assembly 8 towards a stroke start position 24 of the nut screw 10, irrespective of the actuation of the brake pedal 3.

Advantageously, such a configuration allows obtaining even faster response times by the braking feel simulator device 1, since even the slightest response delay of the braking feel simulator device 1 due to the transmission of the activation command from the electronic processing unit 18 to the electric motor 6 is canceled.

According to an embodiment, the electronic processing unit 18 is configured to command the braking feel simulator device 1 to achieve a stiffness curve selectable from a plurality of stiffness curves.

According to this embodiment, each selectable stiffness curve corresponds to a given value of the mechanical opposing torque applicable by the electric motor 6 on the screw-nut screw assembly 8.

Alternatively, each selectable stiffness curve corresponds to a given trend in the mechanical opposing torque applicable by the electric motor 6 on the screw-nut screw assembly 8, varying as a function of the movement of the brake pedal 3 and/or the translation of the nut screw 10.

Advantageously, such a trend of the mechanical opposing torque applicable by the electric motor 6 on the screw-nut screw assembly 8 and varying as a function of the movement of the brake pedal 3 and/or the translation of the nut-nut screw 10, is customizable based on the requirements of a specific driver, so that a customized stiffness curve can be obtained for the specific driver.

According to an embodiment, the braking system 2 is configured to obtain at least two, preferably at least three, different stiffness curves.

The stiffness curves differ in their different steepness, and thus in the different hardness perceivable by the driver operating the brake pedal 3.

By way of example, a driver can choose from three different stiffness curves, referred to as "sport," "drive," and "city," for example, depending on the respective hardness.

According to an embodiment, the braking system 2 comprises a selection device connected to the electronic processing unit 18.

The selection device is configured to allow a driver to select a stiffness curve from a plurality of predetermined stiffness curves of the braking feel simulator device 1.

According to an embodiment, the braking system 2 comprises a master cylinder 33 connected to the brake pedal 3.

The master cylinder 33 comprises a float 34, which is set in motion by the driver's mechanical action on the brake pedal 3. The float 34 has the function of pressurizing the hydraulic fluid.

Moreover, the hydraulic fluid is contained in a reservoir 35 fluidically connected to the master cylinder 33.

The master cylinder 33 is fluidically connected, by means of a first hydraulic duct 36 containing hydraulic fluid, to the absorber 4.

According to an embodiment, a first on-off valve 37 is arranged along the first hydraulic duct 36. The on-off valve 37 can be opened and closed; in the open configuration, it allows the fluid connection between the master cylinder 33 and the absorber 4; in the closed configuration, it disconnects the absorber 4 from the master cylinder 33.

According to an embodiment, the braking system 2 further comprises a second hydraulic duct 38 operatively connected to at least one braking device associated with a wheel of a vehicle.

The second hydraulic duct 38 is connected to the first hydraulic duct 36 by means of a second on-off valve 39.

The second on-off valve can be, in turn, open and closed; in the open configuration, the second on-off valve 39 allows fluid connection between the master cylinder 33 and the braking device, so that the driver can directly operate the braking device with a conventional hydraulic actuation by acting on the brake pedal 3. In the closed configuration, the second on-off valve 39 prevents the direct hydraulic connection between the master cylinder 33 and the braking device. Therefore, the second hydraulic conduit acts as a backup in case of malfunction or power failure of the electric actuation means.

Actuation Method

According to a further aspect of the invention, a method of actuating a braking system 2, as described above, comprises the steps of:

- selecting, by means of a selection device, a stiffness curve from a plurality of predefined stiffness curves achievable by the braking feel simulator device 1;
- detecting, by means of at least one sensor, an actuation of the brake pedal 3;
- upon the detection of an actuation of the brake pedal 3, actuating, by means of an electronic processing unit 18, the electric motor 6 of the braking feel simulator device 1, so that the electric motor 6 applies a mechanical opposing torque on the screw-screw nut assembly 8, preferably against the translation of the nut screw 10.

Preferably, the method comprises, following the steps described above:

- detecting, by at least one sensor, an interruption of the actuation of the brake pedal 3;
- disabling, by means of an electronic processing unit 18, the electric motor 6 of the braking feel simulator device 1 upon the detection of the interruption of the actuation of the brake pedal 3.

According to an alternative embodiment, a method of actuating a braking system 2, as described above, comprises the steps of:

- selecting, by means of a selection device, a stiffness curve from a plurality of predefined stiffness curves of the braking feel simulator device 1;
- actuating, by means of an electronic processing unit 18, the electric motor 6 of the braking feel simulator device 1, so that the electric motor 6 applies a mechanical opposing torque on the screw-nut screw assembly 8, preferably against the translation of the nut screw 10, irrespective of the actuation of the brake pedal 3.

Obviously, those skilled in the art will be able to make changes or adaptations to the present invention, without however departing from the scope of the following claims.

LIST OF REFERENCE NUMERALS

1. Braking feel simulator device
2. Braking system
3. Brake pedal
4. Absorber
5. Electromechanical opposition device
6. Electric motor
7. Drive shaft
8. Screw-nut screw assembly
9. Screw
10. Nut screw
11. Thrust piston
12. Motor axis
13. Actuation axis
14. Transmission
15. Bearing
16. Housing
17. Housing compartment
18. Electronic processing unit
19. Backing body
20. Perimeter wall
21. Backing wall
22. Through-hole
23. First elastic element
24. Stroke start position
25. Stroke stop position
26. Stroke stop wall
27. First backing surface
28. Second backing surface
29. Second elastic element
30. Biasing wall
31. Thrust wall
32. Conveying pipe
33. Master cylinder
34. Float
35. Reservoir
36. First hydraulic duct
37. First on-off valve
38. Second hydraulic duct
39. Second on-off valve
40. Opposition mechanism

The invention claimed is:

1. A braking feel simulator device for a braking system, the braking feel simulator device being adapted to be connected to a brake pedal, wherein the braking feel simulator device comprises:

a thrust piston, and an electromechanical opposition device, wherein the thrust piston is configured to be biased in translation against the electromechanical opposition device, in response to an actuation of the brake pedal, and wherein the electromechanical opposition device is configured to oppose the translation of the thrust piston, wherein the electromechanical opposition device comprises an electric motor and an opposition mechanism, wherein the opposition mechanism is configured to oppose the translation of the thrust piston, wherein the electric motor is configured to actuate the opposition mechanism so that the opposition mechanism opposes the translation of the thrust piston, wherein the opposition mechanism is a screw-nut screw assembly, coaxial to an actuation axis, wherein the screw-nut screw assembly comprises a screw and a nut screw connected to each other so that a relative translation of the nut screw with respect to the screw along the actuation axis corresponds to a relative rotation of the screw with respect to the nut screw about the actuation axis, wherein the electric motor comprises a drive shaft extended along a motor axis, wherein the screw-nut screw assembly is connected to the drive shaft, and the electric motor is configured to apply a mechanical torque on at least either the screw or the nut screw, wherein the thrust piston is configured to be biased against the screw-nut screw assembly in response to the actuation of the brake pedal, so as to translate at least either the screw or the nut screw along the actuation axis, and wherein the electric motor is configured to oppose the translation of the thrust piston and at least either the screw or the nut screw along the actuation axis by applying a mechanical opposing torque on the screw-nut screw assembly, wherein the electromechanical opposition device further comprises a housing extending along the actuation axis, wherein the housing defines a housing compartment therein, and the screw-nut screw assembly is housed in the housing compartment, wherein the screw of the screw-nut screw assembly is connected to the drive shaft of the electric motor so that the screw is configured to receive the mechanical torque from the electric motor, wherein the nut screw of the screw-nut screw assembly is configured to translate along the actuation axis, relative to the screw and the electric motor, but not to rotate relative to the housing, wherein the thrust piston is configured to be biased against the nut screw in response to the actuation of the brake pedal so that the thrust piston translates the nut screw along the actuation axis, and wherein the electric motor is configured to oppose the translation of the nut screw along the actuation axis by applying a mechanical opposing torque on the screw, wherein the electromechanical opposition device comprises a backing body fixed inside the housing compartment, opposite the thrust piston relative to the nut screw, wherein the backing body forms a stroke stop wall facing the nut screw and defining a stroke stop position of the nut screw, and wherein the braking feel simulator device comprises at least one of the following features or a combination thereof:

the backing body is hollow in a direction parallel to the actuation axis, and the screw of the screw-nut screw assembly at least partially passes through the backing body, along the actuation axis, the backing body comprises a perimeter wall extending along the actuation axis, and a backing wall transverse to the actuation axis, wherein the backing wall extends from the perimeter wall in a radial direction to the actuation axis and defines a through-hole coaxial to the actuation axis, wherein the screw of the screw-nut screw assembly extends through the through-hole of the backing wall, the backing wall forms a first backing surface facing the nut screw and an opposite second backing surface facing towards the electric motor, wherein a first end of a first elastic element is positioned abutting against the nut screw and an opposite second end of the first elastic element is positioned abutting against the first backing surface of the backing body, a bearing is positioned abutting against the second backing surface, and a transmission is placed against the bearing.

2. The braking feel simulator device of claim 1, wherein the opposition mechanism is a reversible mechanism.

3. The braking feel simulator device of claim 1, wherein the screw-nut screw assembly and the electric motor are positioned so that the actuation axis coincides with the motor axis.

4. The braking feel simulator device of claim 1, wherein the electric motor is positioned opposite the thrust piston relative to the screw-nut screw assembly.

5. The braking feel simulator device of claim 1, wherein the nut screw is positioned opposite the electric motor relative to the screw, and the thrust piston is configured to translate the nut screw in direction of the electric motor.

6. The braking feel simulator device of claim 1, wherein the electromechanical opposition device comprises a transmission interposed between the electric motor and the screw-nut screw assembly, and wherein the transmission is a reversible type transmission comprising an epicyclic transmission, or a harmonic or cycloidal reducer, or a cascade gear distribution.

7. The braking feel simulator device of claim 1, wherein the electromechanical opposition device comprises a bearing interposed between the electric motor and the screw-nut screw assembly, wherein the bearing is a ball or roller thrust type bearing.

8. The braking feel simulator device of claim 1, wherein the nut screw is translatable between a stroke start position, located at the thrust piston, and a stroke stop position, opposite to the thrust piston with respect to the nut screw, wherein the electromechanical opposition device comprises a first elastic element configured to bias the nut screw towards the stroke start position, and wherein the first elastic element is a helical compression spring, wherein the helical compression spring is placed coaxially to the screw of the screw-nut screw assembly.

9. The braking feel simulator device of claim 1, wherein the electromechanical opposition device comprises a second elastic element interposed between the screw-nut screw assembly and the thrust piston, wherein the second elastic element is configured to bias the screw-nut screw assembly away from the thrust piston, and wherein, the second elastic element is interposed between the nut screw and the thrust piston, the second elastic element is configured to bias the nut screw away from the thrust piston, and the second elastic element is a helical compression spring.

10. The braking feel simulator device of claim 9, wherein the thrust piston forms a blind piston cavity, and the blind piston cavity is open in direction of the nut screw, and wherein the second elastic element is at least partially housed inside the blind piston cavity, and, a first end of the second elastic element is positioned abutting against the thrust piston, inside the blind piston cavity, while an opposite second end of the second elastic element is positioned abutting against the nut screw.

11. The braking feel simulator device of claim 1, wherein the thrust piston comprises a biasing wall, substantially transverse to the actuation axis, and a thrust wall extended in a direction parallel to the actuation axis, transverse to the thrust wall, wherein the thrust piston is configured to receive on the biasing wall a bias of a hydraulic fluid adapted to move the thrust piston in translation toward the screw-nut screw assembly, wherein the biasing wall faces a conveying pipe, and the conveying pipe is configured to fluidically connect the braking feel simulator device to the brake pedal by the hydraulic fluid, and wherein the thrust wall faces the screw-nut screw assembly and is configured to abut against the screw-nut screw assembly upon an actuation of the braking feel simulator device.

12. A braking system, comprising:

a braking feel simulator device adapted to be connected to a brake pedal, wherein the braking feel simulator device comprises:

a thrust piston, and an electromechanical opposition device, wherein the thrust piston is configured to be biased in translation against the electromechanical opposition device, in response to an actuation of the brake pedal, wherein the electromechanical opposition device is configured to oppose the translation of the thrust piston, wherein the electromechanical opposition device comprises an electric motor and an opposition mechanism, wherein the opposition mechanism is configured to oppose the translation of the thrust piston, wherein the electric motor is configured to actuate the opposition mechanism so that the opposition mechanism opposes the translation of the thrust piston, wherein the opposition mechanism is a screw-nut screw assembly, coaxial to an actuation axis, wherein the screw-nut screw assembly comprises a screw and a nut screw connected to each other so that a relative translation of the nut screw with respect to the screw along the actuation axis corresponds to a relative rotation of the screw with respect to the nut screw about the actuation axis, wherein the electric motor comprises a drive shaft extended along a motor axis, wherein the screw-nut screw assembly is connected to the drive shaft, and the electric motor is configured to apply a mechanical torque on at least either the screw or the nut screw, wherein the thrust piston is configured to be biased against the screw-nut screw assembly in response to the actuation of the brake pedal, so as to translate at least either the screw or the nut screw along the actuation axis, and wherein the electric motor is configured to oppose the translation of the thrust piston and at least either the screw or the nut screw along the actuation axis by applying a mechanical opposing torque on the screw-nut screw assembly, and a brake pedal operatively connected to the braking feel simulator device, wherein the electromechanical opposition device further comprises a housing extending along the actuation axis, wherein the housing defines a housing compartment therein, and the screw-nut screw assembly is housed in the housing compartment, wherein the screw of the screw-nut screw assembly is connected to the drive shaft of the electric motor so that the screw is configured to receive the mechanical torque from the electric motor, wherein the nut screw of the screw-nut screw assembly is configured to translate along the actuation axis, relative to the screw and the electric motor, but not to rotate relative to the housing, wherein the thrust piston is configured to be biased against the nut screw in response to the actuation of the brake pedal so that the thrust piston translates the nut screw along the actuation axis, and wherein the electric motor is configured to oppose the translation of the nut screw along the actuation axis by applying a mechanical opposing torque on the screw, wherein the electromechanical opposition device comprises a backing body fixed inside the housing compartment, opposite the thrust piston relative to the nut screw, wherein the backing body forms a stroke stop wall facing the nut screw and defining a stroke stop position of the nut screw, and wherein the braking feel simulator device comprises at least one of the following features or a combination thereof:

the backing body is hollow in a direction parallel to the actuation axis, and the screw of the screw-nut screw assembly at least partially passes through the backing body, along the actuation axis, the backing body comprises a perimeter wall extending along the actuation axis, and a backing wall transverse to the actuation axis, wherein the backing wall extends from the perimeter wall in a radial direction to the actuation axis and defines a through-hole coaxial to the actuation axis, wherein the screw of the screw-nut screw assembly extends through the through-hole of the backing wall, the backing wall forms a first backing surface facing the nut screw and an opposite second backing surface facing towards the electric motor, wherein a first end of a first elastic element is positioned abutting against the nut screw and an opposite second end of the first elastic element is positioned abutting against the first backing surface of the backing body, a bearing is positioned abutting against the second backing surface, and a transmission is placed against the bearing.

13. The braking system of claim 12, further comprising an absorber configured to apply a reaction force on the brake pedal in opposition to the actuation of the brake pedal, wherein the absorber is fluidically connected to the braking feel simulator device and/or to the electromechanical opposition device of the braking feel simulator device by a hydraulic fluid.

14. The braking system of claim 12, further comprising an electronic processing unit electrically connected to the electric motor of the electromechanical opposition device, and at least one sensor configured to detect the actuation and/or a movement of the brake pedal, wherein the electronic processing unit is configured to actuate the electric motor of the electromechanical opposition device only upon a detection, by the at least one sensor, of the actuation and/or the movement of the brake pedal, or wherein the electronic processing unit is configured to actuate the electric motor of the electromechanical opposition device so as to constantly bias the nut screw of the screw-nut screw assembly towards a stroke start position of the nut screw, independently of the actuation of the brake pedal.

15. The braking system of claim 14, wherein the electronic processing unit is configured to control the braking feel simulator device to implement a stiffness curve selectable from a plurality of stiffness curves, wherein each stiffness curve of the plurality of stiffness curves corresponds to a given value of the mechanical opposing torque applicable by the electric motor on the screw-nut screw assembly, or each stiffness curve corresponds to a given trend in the mechanical opposing torque applicable by the electric motor on the screw-nut screw assembly, variable as a function of the movement of the brake pedal and/or the translation of the nut screw.

16. An actuation method of a braking system comprising a braking feel simulator device adapted to be connected to a brake pedal, wherein the braking feel simulator device comprises:

a thrust piston, and an electromechanical opposition device, wherein the thrust piston is configured to be biased in translation against the electromechanical opposition device, in response to an actuation of the brake pedal, wherein the electromechanical opposition device is configured to oppose the translation of the thrust piston, wherein the electromechanical opposition device comprises an electric motor and an opposition mechanism, wherein the opposition mechanism is configured to oppose the translation of the thrust piston, wherein the electric motor is configured to actuate the opposition mechanism so that the opposition mechanism opposes the translation of the thrust piston, wherein the opposition mechanism is a screw-nut screw assembly, coaxial to an actuation axis, wherein the screw-nut screw assembly comprises a screw and a nut screw connected to each other so that a relative translation of the nut screw with respect to the screw along the actuation axis corresponds to a relative rotation of the screw with respect to the nut screw about the actuation axis, wherein the electric motor comprises a drive shaft extended along a motor axis, wherein the screw-nut screw assembly is connected to the drive shaft, and the electric motor is configured to apply a mechanical torque on at least either the screw or the nut screw, wherein the thrust piston is configured to be biased against the screw-nut screw assembly in response to the actuation of the brake pedal, so as to translate at least either the screw or the nut screw along the actuation axis, and wherein the electric motor is configured to oppose the translation of the thrust piston and at least either the screw or the nut screw along the actuation axis by applying a mechanical opposing torque on the screw-nut screw assembly, and a brake pedal operatively connected to the braking feel simulator device, the braking system further comprising an electronic processing unit electrically connected to the electric motor of the electromechanical opposition device, and at least one sensor configured to detect the actuation and/or a movement of the brake pedal, wherein the electronic processing unit is configured to actuate the electric motor of the electromechanical opposition device only upon a detection, by the at least one sensor, of the actuation and/or the movement of the brake pedal, or wherein the electronic processing unit is configured to actuate the electric motor of the electromechanical opposition device so as to constantly bias the nut screw of the screw-nut screw assembly towards a stroke start position of the nut screw, independently of the actuation of the brake pedal, the actuation method comprising:

selecting, using a selection device, a stiffness curve from a plurality of predefined stiffness curves achievable by the braking feel simulator device; and upon selecting the stiffness curve, the actuation method further comprising either:

actuating, by the electronic processing unit, the electric motor, so that the electric motor applies the mechanical opposing torque on the screw-nut screw assembly, independently of the actuation of the brake pedal, or detecting, by the at least one sensor, the actuation of the brake pedal; and upon the detection of the actuation of the brake pedal, actuating, by the electronic processing unit, the electric motor, so that the electric motor applies the mechanical opposing torque on the screw-nut screw assembly, wherein the electromechanical opposition device comprises an electric motor and an opposition mechanism, wherein the opposition mechanism is configured to oppose the translation of the thrust piston, wherein the electric motor is configured to actuate the opposition mechanism so that the opposition mechanism opposes the translation of the thrust piston, wherein the electromechanical opposition device further comprises a housing extending along the actuation axis, wherein the housing defines a housing compartment therein, and the screw-nut screw assembly is housed in the housing compartment, wherein the screw of the screw-nut screw assembly is connected to the drive shaft of the electric motor so that the screw is configured to receive the mechanical torque from the electric motor, wherein the nut screw of the screw-nut screw assembly is configured to translate along the actuation axis, relative to the screw and the electric motor, but not to rotate relative to the housing, wherein the thrust piston is configured to be biased against the nut screw in response to the actuation of the brake pedal so that the thrust piston translates the nut screw along the actuation axis, and wherein the electric motor is configured to oppose the translation of the nut screw along the actuation axis by applying a mechanical opposing torque on the screw, wherein the electromechanical opposition device comprises a backing body fixed inside the housing compartment, opposite the thrust piston relative to the nut screw, wherein the backing body forms a stroke stop wall facing the nut screw and defining a stroke stop position of the nut screw, and wherein the braking feel simulator device comprises at least one of the following features or a combination thereof:

the backing body is hollow in a direction parallel to the actuation axis, and the screw of the screw-nut screw assembly at least partially passes through the backing body, along the actuation axis, the backing body comprises a perimeter wall extending along the actuation axis, and a backing wall transverse to the actuation axis, wherein the backing wall extends from the perimeter wall in a radial direction to the actuation axis and defines a through-hole coaxial to the actuation axis, wherein the screw of the screw-nut screw assembly extends through the through-hole of the backing wall, the backing wall forms a first backing surface facing the nut screw and an opposite second backing surface facing towards the electric motor, wherein a first end of a first elastic element is positioned abutting against the nut screw and an opposite second end of the first elastic element is positioned abutting against the first backing surface of the backing body, a bearing is positioned abutting against the second backing surface, and a transmission is placed against the bearing.

* * * * *